US010116696B2

(12) United States Patent
Porras et al.

(10) Patent No.: US 10,116,696 B2
(45) Date of Patent: Oct. 30, 2018

(54) NETWORK PRIVILEGE MANAGER FOR A DYNAMICALLY PROGRAMMABLE COMPUTER NETWORK

(71) Applicant: SRI International, Menlo Park, CA (US)

(72) Inventors: Phillip A. Porras, Cupertino, CA (US); Kenneth C. Nitz, Redwood City, CA (US)

(73) Assignee: SRI International, Menlo Park, CA (US)

( * ) Notice: Subject to any disclaimer, the term of this patent is extended or adjusted under 35 U.S.C. 154(b) by 297 days.

(21) Appl. No.: 14/322,692

(22) Filed: Jul. 2, 2014

(65) Prior Publication Data

US 2014/0331280 A1    Nov. 6, 2014

Related U.S. Application Data

(63) Continuation-in-part of application No. 14/322,617, filed on Jul. 2, 2014, now Pat. No. 9,571,523, which is a continuation-in-part of application No. 13/801,855, filed on Mar. 13, 2013, now Pat. No. 9,444,842, and a continuation-in-part of application No. 13/801,871, filed on Mar. 13, 2013, now Pat. No. 9,705,918.

(60) Provisional application No. 62/011,800, filed on Jun. 13, 2014, provisional application No. 61/991,345, filed on May 9, 2014, provisional application No.
(Continued)

(51) Int. Cl.
*H04L 29/06* (2006.01)

(52) U.S. Cl.
CPC ............ *H04L 63/20* (2013.01); *H04L 63/126* (2013.01)

(58) Field of Classification Search
USPC ............ 726/4, 2, 21, 36; 713/150, 163, 181; 380/255, 264, 276
See application file for complete search history.

(56) References Cited

U.S. PATENT DOCUMENTS

2003/0005307 A1* 1/2003 Bartley ............... G06F 21/6218
                                                               713/182
2007/0250644 A1* 10/2007 Lund .................... G06Q 10/107
                                                               709/245
(Continued)

OTHER PUBLICATIONS

Porras, Phillip, et al., "A Security Enforcement Kernel for OpenFlow Networks," HotSDN'12, Aug. 13, 2012, 6 pages.
(Continued)

*Primary Examiner* — Sharif E Ullah
(74) *Attorney, Agent, or Firm* — Hickman Palermo Becker Bingham LLP

(57) ABSTRACT

A network security policy may be implemented at network switches as a set of active packet disposition directives. In a dynamically programmable network, the network switches can be dynamically reprogrammed with new packet disposition directives. An event auditor passively monitors network traffic and provides network activity data indicative of network flows to a network privilege manager. The network privilege manager determines a current network context based on the network activity data. In response to the current network context, the network privilege manager selects a security policy and generates one or more flow policy directives in accordance with the selected policy.

25 Claims, 6 Drawing Sheets

Related U.S. Application Data

61/845,253, filed on Jul. 11, 2013, provisional application No. 61/650,287, filed on May 22, 2012.

(56) References Cited

U.S. PATENT DOCUMENTS

| | | | |
|---|---|---|---|
| 2009/0172815 A1 | 7/2009 | Gu et al. | |
| 2010/0235915 A1* | 9/2010 | Memon | H04L 63/145 726/23 |
| 2011/0214157 A1* | 9/2011 | Korsunsky | G06F 21/55 726/1 |
| 2013/0329601 A1 | 12/2013 | Yin et al. | |
| 2014/0003232 A1 | 1/2014 | Guichard et al. | |

OTHER PUBLICATIONS

Porras, Phillip, "Empowering Dynamic Network Defenses Across OpenFlow Networks," SDN Security Seminars 2012, Feb. 28, 2012, 26 pages.

Porras, Phillip, et al., "An Overview of the FortNOX Security Kernel," available at http://www.openflowsec.org/, Dec. 2012, 29 pages.

Chua, Roy, "Interview with Phil Porras: Lack of Secure Controller Hurting OpenFlow?" Jul. 3, 2012, available at http://www.sdncentral.com/sdn-blog/phil-porras-openflow-secure-controller/2012/07/, printed Jun. 12, 2013, 11 pages.

Chua, Roy, "SDN Security—An Oxymoron? New Interview with Phil Porras of SRI International," Feb. 26, 2013, available at http://www.sdncentral.com/sdn-blog/sdn-security-oxymoron-phil-porras-sri/2013/02/, printed Jun. 12, 2013, 9 pages.

Shin, Seugwon, et al., "FRESCO: Modular Composable Security Services for Software-Defined Networks," ISOC Network and Distributed System Security Symposium, Feb. 2013, 16 pages.

Porras, Phillip, "OpenFlowSec.org Demonstration Videos," video material available at http://www.openflowsec.org/OpenFlow_Security/Demo_Vids.html, accessed Jun. 14, 2013, 7 pages.

Ferro, Greg, "OpenFlow vs. Traditional Networks," InformationWeek Reports, Jan. 2012, 13 pages.

Sherwood, Rob, et al., "FlowVisor: A Network Virtualization Layer," available at http://openflowswitch.org/downloads/technicalreports/open-flow-tr-2009-1-flowvisor.pdf, Oct. 14, 2009, 15 pages.

Utility U.S. Appl. No. 13/801,855, filed Mar. 13, 2013, 55 pages.
U.S. Appl. No. 61/650,287, filed May 22, 2012, 20 pages.
Utility U.S. Appl. No. 13/801,871, filed Mar. 13, 2013, 56 pages.
U.S. Appl. No. 61/991,345, filed May 9, 2014, 115 pages.
U.S. Appl. No. 61/892,668, filed Oct. 18, 2013, 38 pages.
U.S. Appl. No. 62/011,800, filed Jun. 13, 2014, 17 pages.
U.S. Provisional Patent Application "Contextual Blacklisting and Flow Policy Enforcement", filed Jul. 11, 2013, 27 pages.

* cited by examiner

```
                                                                                        500
218      502                                                                            )
 ↘       ↙                                              504
      <Policy>                                          ↙
222    ↗ <Response action="BLOCK %SrcIP">       506
220       <Criteria cid="1" Blacklisted="1"
   ↘        description="Workstation to bad webservers"
            SrcRole="%workstation" DstPort="%webPort"
            Threshold="3,60,{SrcIP,DstIP,SrcDstIP}"
          />
       </Response>            508
                              ↙    510
222    ↗ <Response action="WARN">  ↙
220       <Criteria cid="2"
   ↘        description="App-to-DB RST Err" SrcRole="%appTier"
            DstRole="%DBTier" DstPort="%DB_Ports"
            FlowState="CL_RST,SRV_RST"
            ThresholdCount="3" ThresholdSeconds="60"
          />
       </Response>
                                    512
222    ↗ <Response Action="DENY">   ↙   514
220       <Criteria cid="3"
   ↘        description="Allow BitTorrent if not too congested"
            DstRole="%BitTorrentServers"
            DstPort="%BitTorrentPorts"
            SrcRole="%External" FlowState="INIT"
            InBoundTCPFlowCount="gt2000" />
       </Response>

</Policy>
```

FIG. 5

NETWORK PRIVILEGE MANAGER FOR A DYNAMICALLY PROGRAMMABLE COMPUTER NETWORK

CROSS-REFERENCE TO RELATED APPLICATIONS

This application claims the benefit of and priority to U.S. Provisional Patent Application Ser. No. 62/011,800, filed Jun. 13, 2014, and U.S. Provisional Patent Application Ser. No. 61/991,345, filed May 9, 2014, and U.S. Provisional Patent Application Ser. No. 61/845,253, filed Jul. 11, 2013, and is a continuation-in-part of U.S. Utility patent application Ser. No. 14/322,617, filed Jul. 2, 2014, which is a continuation-in-part of U.S. Utility patent application Ser. Nos. 13/801,855 and 13/801,871, filed Mar. 13, 2013, both of which claim the benefit of and priority to U.S. Provisional Patent Application Ser. No. 61/650,287, filed May 22, 2012; and each of the foregoing applications is incorporated herein by this reference in its entirety.

GOVERNMENT RIGHTS

This invention was made in part with government support under contract number FA8750-11-C-0249 awarded by the Air Force Research Laboratory and contract number W911NF-06-1-0316 awarded by the Army Research Office. The Government has certain rights in this invention.

BACKGROUND

Software-defined networking refers to an approach to building a computer network that allows for programmable network switch infrastructures, in which the rules that determine how the network switches are to process network flows can be dynamically specified and changed. Such programmability is useful, for instance, in the management of virtual computing resources that may be spawned or terminated on demand. The OPENFLOW network model is one example of a protocol that may be used to implement software-defined networking.

According to traditional notions of network perimeter defense, network security may be provided by a well-defined (e.g., static) security policy that can be instantiated for a particular network topology. In traditional network environments, the security policy often can be deployed and enforced consistently across the network infrastructure.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

FIG. 5 is a schematic diagram of pseudocode for contextual security policies that may be enforced by the network privilege manager of FIGS. 1 and 2.

DETAILED DESCRIPTION OF THE DRAWINGS

Figure 1:
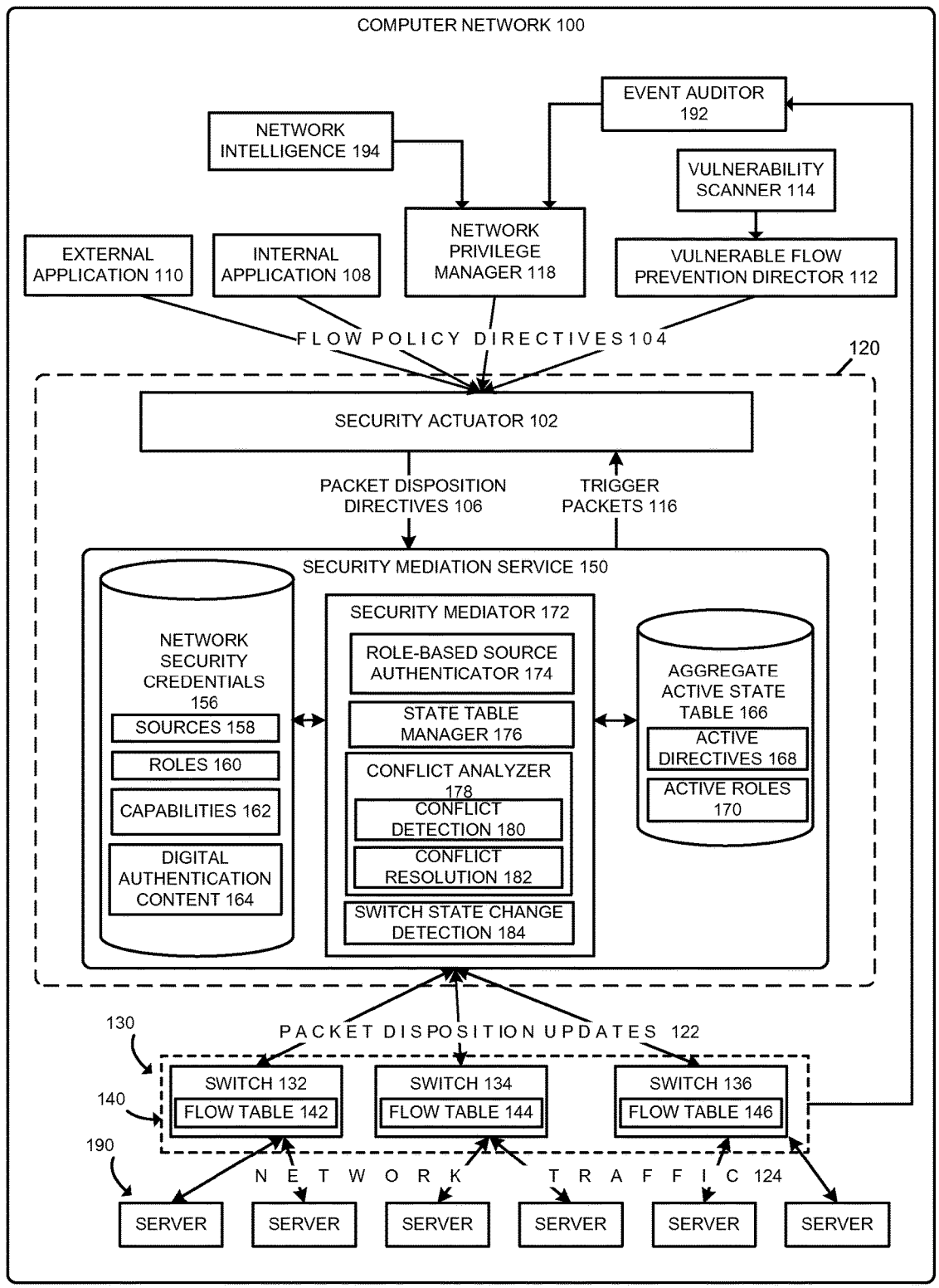
FIG. 1 is a simplified block diagram of at least one embodiment of a dynamically programmable network including a network privilege manager.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Dynamically programmable networks, some embodiments of which may be referred to as software-defined networks or SDNs, present several new and unique challenges to the effective enforcement of traditional security policies. For instance, many different network flow control applications may be active on a particular SDN. These network applications may attempt to change the network flow control policies dynamically. Further, some network applications may incorporate security vulnerabilities, or may possibly be written by adversaries who wish to use the network application to take control of the network. In some cases, the flow control policies of the various active network applications may potentially conflict, in that some of the flow policies may be contradictory or may attempt to evade or override other flow policies.

For instance, in an evasion scenario referred to herein as dynamic flow tunneling, a network application may seek to evade an existing flow rule by adding a series of flow rules that redirect packets "around" the existing flow rule by modifying the packet header information (using, e.g., a "goto table" directive or "set" action). As an example, in a hypothetical SDN, suppose there are three host computers, one network switch, and one network controller (where a "network controller" in SDN terminology refers to software that acts as an interface between other running software applications, which produce network flows, and the switches or other packet-forwarding devices on the network). Suppose further that a firewall implemented as a network application on the hypothetical SDN has implemented a flow rule that requires the blocking of network packets that specify a particular source Internet Protocol (IP) address and a particular destination IP address. For instance, the firewall's flow rule may require packets from an outside host identified by an address, 10.0.0.2, that are directed to a web service identified as port 80, running on a host identified by an address, 10.0.0.4, to be blocked. Another network application may then attempt to add three new flow rules to be implemented by the network controller as follows. The first proposed rule modifies the source IP address of a packet to 10.0.0.1 if a packet is delivered from 10.0.0.2 to 10.0.0.3 (port 80). The second proposed rule changes the destination IP address of a packet to 10.0.0.4 if a packet is delivered from 10.0.0.1 to 10.0.0.3 (port 80). The third proposed rule simply allows the forwarding of a packet from 10.0.0.1 to 10.0.0.4 at port 80. None of these flow rules, taken individually, conflicts with the firewall's flow rule and thus would be implemented by the network controller, in the absence of security features such as those described herein.

If these proposed flow rules were to be implemented, the firewall's flow rule that blocks packets from 10.0.0.2 to 10.0.0.4 could be evaded. To illustrate this, suppose the host 10.0.0.2 sends a data packet to port 80 of the host 10.0.0.3. This packet can bypass the firewall because it does not directly go to the host 10.0.0.4, but to 10.0.0.3. However, this packet will eventually be delivered to the host 10.0.0.4 by the network controller even if there is a firewall forbidding such traffic, as a result of the second and third proposed flow rules above. In this way, an inadvertently erroneous or malicious network application can evade an existing firewall by simply adding a few flow rules.

These and other challenges can be addressed by implementing a non-bypassable security mediation service on the dynamically programmable network. As disclosed herein, embodiments of the security mediation service can monitor and evaluate flow rule insertion requests and other packet disposition directives (e.g., "packet-outs," "port mods," etc.) against a dynamically-changing security policy, and can do so in "real time," e.g., in response to the directives being produced by the network administrator and/or various software applications running on the network and before the directives are implemented by the network devices (e.g., switches). Embodiments of the security mediation service may enforce and preserve the integrity of the dynamically programmable network's security policy by providing role-based source authentication, conflict detection, conflict resolution, or any combination thereof. Some embodiments of the disclosed security mediation service are also described, for example, in Phillip A. Porras et al., *A Security Enforcement Kernel for OpenFlow Networks*, HotSDN'12, at 121-126 (Aug. 13, 2012); and Phillip A. Porras, *Empowering Dynamic Network Defenses Across OpenFlow Networks*, delivered at the SDN Security Seminars 2012 on Feb. 28, 2012, in San Francisco, Calif., both of which are incorporated herein by this reference. Other materials describing embodiments of the disclosed security mediation service, including video materials by Phillip A. Porras entitled *Inside FortKnox, Security Constraints Enforcement, Reflector Nets, and Automated Quarantine*, are posted at http://www.openflowsec.org/ and incorporated herein by this reference. Additionally, Mr. Porras discussed embodiments of the disclosed security mediation service in an interview posted on Jul. 3, 2012 at http://www.sdncentral.com/sdn-blog/phil-porras-openflow-secure-controller/2012/07/ (*Interview with Phil Porras: Lack of Secure Controller Hurting OpenFlow?*) and in an interview posted on Feb. 26, 2013 at http://www.sdncentral.com/sdn-blog/sdn-security-oxymoron-phil-porras-sri/2013/02/ (*SDN Security—An Oxymoron? New Interview with Phil Porras of SRI International*), both of which are incorporated herein by this reference.

Referring now to FIG. 1, a computer network 100 includes a plurality of computerized modules or components described below. Each of the modules and components shown and described in the figures may be implemented on one or more computing devices as hardware, software, firmware, or a combination thereof. The computer network 100 includes an embodiment of a network privilege manager module 118, which is in communication with a security actuator 102, which is in communication with a security mediation service 150 of the computer network 100. The illustrative computer network 100 is embodied as a dynamically programmable network, such as an OPENFLOW network. As shown by the dashed lines, the security actuator 102 and the security mediation service 150 may embodied in or as a network flow controller 120 of the network 100. In other embodiments, the security actuator 102 and/or the security mediation service 150 may be considered part of a "control plane" of the network 100 but not necessarily part of the controller 120, itself. For instance, the security actuator 102 may be embodied as an internal application 108, described below, which communicates with the controller 120 via, e.g., an application programming interface (API). As an example, using the OPENFLOW framework, the security actuator 102 may communicate with the controller 120 via a northbound API, where, for example, the security actuator 102 contains a client-side northbound API and the controller 120 contains a server-side northbound API. The security actuator 102, the controller 120, or the mediation service 150 may communicate directly with a number of network switches 130 via, e.g., a southbound API of an OPENFLOW network. Alternatively, the security actuator 102 communicates with the network switches 130 indirectly via the controller 120 or the security mediation service 150.

The illustrative dynamically programmable computer network 100 is embodied as a packet-switching digital communications network that is implemented using a software-defined networking approach (such as the OPENFLOW protocol). In some embodiments, the network 100 may correspond to a physical or logical (e.g., virtualized) subset of a larger network, such as a "network slice." As used herein, "packet" may refer to, among other things, a data packet, a network packet, data and/or control communications, or portions of such communications that are transmitted between devices or otherwise travel on the network 100.

As illustrated in FIG. 1, the network flow controller 120 includes the security actuator 102 and the security mediation service 150, which, among other things, operate to control the network communications between computer applications 108, 110 and one or more network switches 132, 134, 136 on the dynamically programmable network 100. In some embodiments, the security actuator 102 may be included as a component of the security mediation service 150 (e.g., operate in the same process space as other components of the security mediation service 150). For example, the security actuator 102 may communicate directly with a security mediator 172 of the security mediation service 150.

The network flow controller 120 or portions thereof typically execute in a separate process space from at least the external network applications 110 and are also usually separated from any processes that may be running at the switches 132, 134, 136 (e.g., the "data plane"). For example, in some embodiments, the security mediation service 150 is not implemented as part of a firewall.

The network flow controller 120 may be embodied as a software abstraction of the network control layer (e.g., "control plane") of the network switches 132, 134, 136. For instance, the network flow controller 120 may be implemented as part of or as an extension to an SDN controller, such as an OpenFlow controller. Some vendors of SDN controllers include Big Switch Networks (e.g., the Floodlight OpenSDN controller), HP, IBM, VMWare, and Juniper. In other embodiments, the network flow controller 120 may be embodied in a shim layer between a network controller and the network applications 108, 110, or as part of another type of network virtualization layer. One example of a network virtualization layer for an SDN (and OpenFlow, specifically) is FlowVisor, developed by Stanford University, Deutsch Telecom, Inc., and Nicira Networks. In any case, the network flow controller 120 may execute on one or more computing devices (e.g., servers), separately from the network switches 132, 134, 136 and/or separately from other computing devices on which the applications 108, 110 may be running.

The network flow controller 120 may be connected to each of the switches 132, 134, 136 using, e.g., a dedicated control connection. The network switches 132, 134, 136 each may be embodied as, for example, a switch, a router, a load balancer, a learning switch, or another type of network device. The switches 132, 134, 136 each communicate with one or more servers 190 to effectuate the flow of network traffic 124 across the network 100 in accordance with a network security policy. As used herein, terms such as "network traffic" and "network flow" refer to, in the context of the network 100, sequences of data packets from a source computer to a destination, where the destination may be, for example, another host, a multicast group, or a broadcast domain. In some cases, network flow may refer to a logical equivalent of a call or a connection. A network flow may include all of the data packets in a specific transport connection or media stream. However, a network flow need not be directly mapped to a transport connection. A network flow can also be thought of as a set of data packets that pass an observation point in the network during a certain time interval.

The security policy for the dynamically programmable network 100 may be established by, for example, a network administrator using an intuitive policy expression and implementation language, which is described in more detail in the aforementioned provisional patent applications. In some implementations, the security policy is user-created at a high level of abstraction, e.g., by the user specifying a set of criteria and actions using familiar terminology, such as parameter names that are known from network definition and configuration files. In some embodiments, the network privilege manager 118 or another module of the computer network ingests data output by an event auditor 192 and/or a network intelligence module 194 and then outputs and implements "contextual" policy enforcement logic using, a policy specification template (e.g., an XML-based template). As used herein, "contextual" refers to the capability of the network privilege manager 118 to flexibly apply the security policy based on current network operating conditions, including current network flows as well as "real time" changes in policy affecting data, such as access control data (e.g., blacklists and whitelists), as well as real time changes to the security policy itself. To do this, the illustrative network privilege manager 118 monitors e.g., blacklist, whitelist, and/or policy files concurrently with its policy enforcement operations, and propagates updates to the policy enforcement logic as they occur. For example, if a blacklist or whitelist is updated, the network privilege manager 118 does, in an automated fashion, update the affected policy logic to refer to the updated blacklist or whitelist. Similarly, if the security policy itself is updated, the network privilege manager 118 implements the policy changes in an automated fashion (e.g., without manual effort).

As used herein, the term "network administrator" may refer to, for example, a human operator, a network security software application, and/or a computerized agent or delegate of a human operator, such as a software application that acts under the direction of or in response to inputs from the human operator. The security policy may be implemented at the switches 132, 134, 136 as a number of network flow rules, which are maintained at the switches 132, 134, 136 in local flow tables 142, 144, 146. The local flow tables 142, 144, 146 are used by their respective switches 132, 134, 136 to instantiate flow rules at the switch and direct the network traffic 124 between the servers 190. Each of the switches 132, 134, 136 updates its respective local flow table 142, 144, 146 in accordance with the packet disposition updates 122. In some embodiments, the switches 132, 134, 136 may communicate changes in the local flow tables 140 back to the security mediation service 150. For simplicity, the illustrative network 100 is shown with three network switches 132, 134, 136 having local flow tables 142, 144, 146, respectively; however, the network 100 may include any number of switches 132, 134, 136.

Each of the servers 190 may be embodied as any suitable type of computing resource, e.g., a server computer, group of server computers, or one or more other devices that are configured to communicate with the switches 132, 134, 136 to send and receive data packets over the network 100. For simplicity, the illustrative network 100 is shown with a fixed number of servers 190 per switch 130; however, the network 100 may include any number of servers 190 in communication with any number of switches 130.

The network applications 108, 110 may each be embodied as any software, firmware, hardware, or combination thereof that controls, defines, or otherwise interacts with the dynamically programmable network 100. For instance, the network applications 108, 110 may include network security applications and/or other types of software applications running on the network 100. Each of the network applications 108, 110 may produce one or more flow policy directives 104 that are received by the security actuator 102.

The illustrative internal network application 108 is embodied as a network software application that executes in the same process space as the security actuator 102. For example, the internal network application 108 may be embodied as a loadable module executing within the same operating system process as the security actuator 102. As another example, the internal network application 108 may be embodied as a bytecode module loaded from the same archive as the security actuator 102.

The illustrative external network application 110 is embodied as a network software application that executes outside of the process space of the security actuator 102, or even outside the process space of the network flow controller 120. For example, the external network application 110 may be embodied as a separate operating system process executing on the same computing device as the network flow controller 120 or on a remote computing device. As a separate operating system process, the external network application 110 may execute from a separate, non-privileged account. In other embodiments, the external network application 110 may be embodied as a Python OpenFlow application that communicates with the security actuator 102 through a Python Simplified Wrapper and Interface Generator (SWIG).

The illustrative network 100 further includes a vulnerable flow prevention director 112 and a vulnerability scanner 114. The vulnerability scanner 114 may be embodied as any vulnerability scanner, service, or other process than scans the network 100 for applications or services containing known vulnerabilities (e.g., software, firmware, hardware, or a combination thereof). The vulnerability scanner 114 may produce, for example, a collection of vulnerable host/port information. The vulnerability scanner 114 may be embodied as a third-party or legacy application that is unaware of the dynamic programmability of the network 100. The vulnerable flow prevention director 112 periodically causes the vulnerability scanner 114 to scan the network 100, and based on the output generated by the vulnerability scanner 114, submits flow policy directives 104 to the security actuator 102. The vulnerable flow prevention director 112 may, for example, generate flow policy directives 104 to redirect external visitors away from a vulnerable host/port combination while continuing to allow internal access to the vulnerable host/port, redirect all traffic away from the vulnerable host/port combination, or implement any other desired network flow policy. The vulnerable flow prevention director 112 is illustrated as an internal network application 108; however, the vulnerable flow prevention director 112 may be embodied as an external network application 110 or any other type of application capable of interfacing with the security actuator 102.

The network privilege manager 118 is embodied as software, firmware, hardware, or a combination thereof. The network privilege manager 118 is configured to monitor the current network context of the network 100 based on data received from many sources, and to generate appropriate flow policy directives 104 based on one or more contextual security policies of the network 100. The current network context may include any data indicative of one or more dynamic properties of the network traffic 124; that is, the current network context may depend on, for example, the current behavior of hosts on the network 100, the current version of a blacklist or whitelist, etc. To determine the current network context, the network privilege manager 118 may monitor, for example, network activity data indicative of one or more network flows identified within the network traffic 124. The network activity data may be cross-referenced or otherwise compared with network configuration data such as network roles as well as live IP reputation data such as network blacklists. The contextual security policies allow a network administrator to define appropriate responses for a variety of circumstances defined by dynamic attributes or properties of the network 100. The contextual security policies may define a number of criteria to match against the current network context and an associated response. Responses may include security-related directives such as directives to block or quarantine certain addresses or redirect certain network flows. The network privilege manager 118 is illustrated as an external application 110; however, it should be understood that in some embodiments the network privilege manager 118 may be embodied as an internal application 108.

The event auditor 192 is configured to passively monitor, over time, the network traffic 124 and generate network activity data based on the network traffic 124. Some embodiments of the event auditor 192 monitor, over time, the status of network intelligence data such as blacklists, whitelists, and security policy updates. The generated network activity data may include data records corresponding to particular network flows as well as aggregate records corresponding to overall network traffic 124. The event auditor 192 may output the network activity data to the network privilege manager 118.

The network intelligence 194 is configured to provide an updated source of IP reputation data at different time instances. The network intelligence 194 may maintain a list of known malicious Internet address, also known as a network address blacklist. The blacklist may include additional information identifying or describing each malicious network address, as well as information on the type of threat associated with the malicious network address. The network intelligence 194 may, alternatively or in addition, include information identifying or describing known permissible (or acceptable) network addresses or flow, as described in more detail in the aforementioned Provisional Patent Application Ser. No. 62/011,800. The network intelligence 194 may update the IP reputation data (including blacklist and/or whitelist data) periodically or as new threats are discovered. The network intelligence 194 may be embodied as a network server 190 or other host of the dynamically programmable computer network 100, or as a remote server, web service, or other remote resource.

It should be understood that the network 100 may include any number of external and/or internal network applications 108, 110, or other types of computer applications (e.g., software, firmware, hardware, or a combination thereof) beyond those illustrated in FIG. 1, which may communicate with the network flow controller 120 (e.g., via the security actuator 102). For example, the network 100 may include a network-based botnet detection application such as BotHunter (www.bothunter.net) or any other network security application. The botnet detection application may be embodied as a method and apparatus for detecting malware infection as described in United States Patent Application Publication No. 2009/0172815, which is incorporated herein by this reference in its entirety. As used herein, "computer application" or "application" may refer to, among other things, any type of computer program or computer-readable instructions, whether implemented in software, hardware, or a combination thereof, and includes, for example, operating system programs, middleware (e.g., APIs, runtime libraries, utilities, etc.), self-contained software applications, or a combination of any of the foregoing.

The security actuator 102 is embodied as software, firmware, hardware, or a combination thereof. The security actuator 102 is configured to convert flow policy directives 104 received from the network applications 108, 110 into packet disposition directives 106 that may be submitted to the security mediation service 150. For example, the security actuator 102 may receive high-level threat-mitigation directives expressed in the flow policy directives 104 that are translated into lower-level packet disposition directives 106. As used herein, "higher-level" and "lower-level" may refer to, among other things, relative degrees of abstraction, where higher-level may refer to directives that are more like human-intelligible text and lower-level may refer to directives that are more like machine-intelligible codes and less like human-intelligible text.

The packet disposition directives 106 may include a number of trigger rules, which cause the network switches 132, 134, 136 to forward matching trigger packets 116 back to the security actuator 102 for further analysis, and may cause the security actuator 102 to create additional packet disposition directives 106. The packet disposition directives 106 are embodied as data communications transmitted over the network 100.

As further described in the aforementioned U.S. Utility patent application Ser. No. 14/322,617, the security actuator 102 may resolve the higher-level directives using a predefined set of flow policy directives 104, which may include, for example, "block," "deny," "allow," "redirect," "quarantine," "undo," "constrain," and/or "info" directives. A "block" flow policy directive 104 may, for example, implement a full duplex filter between a Classless Inter-Domain Routing (CIDR) block and the internal network, where the primary use for this command is in blacklist enforcement. The deny, allow, undo, and info flow policy directives 104 may be similar to their firewall counterparts and can be capable of being refined down to an individual flow rule. A "redirect" flow policy directive 104 may, for example, enable a network application 108, 110 to tunnel all flows between a source and given target to a new target. With a flow policy directive 104, a switch 132, 134, 136 may rewrite the packet headers of all applicable network flows such that a source cannot tell that its flows have been redirected to the new target. One application of the "redirect" flow policy directive 104 includes the redirection of a malicious scanner into a honeynet. A "quarantine" flow policy directive 104 may enable a network application 108, 110 to essentially isolate an internal host from the network. A "constrain" flow policy directive 104 may enable a network application 108, 110 to deactivate all current flow rules in the switches 132, 134, 136 that are not set to a specified priority (e.g., flow rules that are non-privileged).

The security mediation service 150 includes a security mediator 172, which receives packet disposition directives 106 from the security actuator 102 in a non-bypassable manner. That is, the illustrative security mediator 172 is implemented between the security actuator 102 and the network switches 132, 134, 136, so that all packet disposition directives 106 pass through or are intercepted by the security mediator 172 before being implemented by the switches 132, 134, 136. The security mediator 172 evaluates the packet disposition directives 106 based on the then-current network security policy, as described in more detail below. After a packet disposition directive 106 has been evaluated by the security mediator 172, the security mediation service 150 may communicate a corresponding packet disposition update 122 to one or more of the network switches 132, 134, 136 or to the security actuator 102. The security mediator 172 is implemented as software, hardware, firmware, or a combination thereof.

As used herein, a "packet disposition directive" may refer to, among other things, flow rules or any computer logic that determines or results in the disposition of one or more data packets by the switches 132, 134, 136 on the dynamically programmable network 100, or that changes the switches' behavior or configuration in any way. Some examples of potential packet dispositions include "forward" (in which a data packet is sent on to its next, intermediate or final, destination), "drop" (in which a switch deliberately does not send a data packet on to its next destination, because, for example, the switch's capacity is overloaded or the switch believes that the packet is part of a denial-of-service attack), and "modify" (in which information in the packet header is modified by the directive). Thus, packet disposition directives 106 can include flow rule insertion requests as well as other types of communications that result in a packet disposition without specifying a flow rule, such as "packet-outs" and "port mods." A packet-out refers, generally, to a packet disposition directive 106 that may request one or more of the switches 132, 134, 136 to generate network traffic 124 in response to a specified network condition. A port mod refers, generally, to a packet disposition directive 106 that can enable or disable a port of a network switch 130. Packet disposition directives 106 can be produced by, for example, the network administrator and/or by any one or more of the network applications 108, 110. The packet disposition directives 106 may conform to or extend a software-defined network protocol implemented by the network flow controller 120. For example, in some embodiments, the packet disposition directives 106 may be OpenFlow messages. In some embodiments, the packet disposition directives 106 may directly correspond to flow rules that can be directly instantiated at the network switches 132, 134, 136.

As used herein, a "flow rule" refers to packet disposition directives 106 that contain logic that, if executed at the network switches 132, 134, 136, do control the flow of data packets across the network 100. Thus, the set of all flow rules instantiated on the dynamically programmable network 100 embodies a current implementation of the network security policy. However, in the dynamically programmable network 100, flow rules, and thus, the network security policy, can be modified "on the fly" by the packet disposition directives 106. Thus, as used herein, "dynamically" connotes a network in which the flow rules, and thus the security policy, may be constantly varying or changing in response to, for example, the then-current network conditions. As used herein, terms such as "currently active flow rules" or "currently active directives" refer generally to the set of flow rules and/or other packet disposition directives that, at a particular moment in time during the operation of the network 100, represents the then-current network security policy. As used herein, terms such as "candidate flow rule" or "candidate directive" may refer to, among other things, any flow rule or other packet disposition directive that is not currently part of the set of currently active directives. In other words, "candidate flow rules" may refer to flow rules that have not yet been evaluated by the security mediator 172, are currently being evaluated by the security mediator 172, or that have been evaluated but rejected by the security mediator 172.

To simplify the discussion, flow rules are referred to herein as having two main parts: match criteria and actions. The match criteria determine whether a flow rule applies to a particular data packet. The match criteria include a number of match fields, including those that specify source and destination criteria for matching data packets to the flow rule. The source and destination match fields each identify particular computing resources by any suitable references or identifiers, such as IP addresses, network masks, ports, and the like. In some embodiments, match fields other than source and destination may be used to evaluate the applicability of a flow rule to a data packet, and in some embodiments, one match criterion or multiple match criteria may be used.

A flow rule may contain one or more actions. The action(s) contained in the flow rule specify what action(s) are to be taken by a network switch if the flow rule applies to a particular data packet; that is, if the values of the match fields of the flow rule match the values of the corresponding match fields in the header of the data packet. An action may specify a disposition for the data packet, for example, to drop, forward, or modify the data packet. Some flow rules may specify that the data packet's header information is to be modified or rewritten, e.g., using a "set" action (in OpenFlow terminology), if the flow rule applies to the packet. Some flow rules may specify that the data packet is to be forwarded to the network controller for further analysis.

Referring now in more detail to the security mediation service 150 of FIG. 1, the security mediation service 150 validates the sources of the packet disposition directives 106, analyzes the packet disposition directives 106 for conflicts with existing flow rules, and performs role-based conflict resolution. The security mediation service 150 detects and resolves conflicts quickly, allowing for real-time or near-real time control of the network flow rules. The illustrative security mediation service 150 is embodied as a number of computerized modules and data structures (e.g., software, firmware, hardware, or a combination thereof) including a network security credentials table 156, an aggregate active state table 166, and a security mediator 172. Such computerized modules and data structures may execute or be resident on the same computing device or group of computing devices as the network flow controller 120, and/or on one or more other computing devices that are connected to the network 100.

To receive packet disposition directives 106 from the security actuator 102, the security mediation service 150 may include one or more network communication interfaces. For example, packet disposition directives 106 may be received from the security actuator 102 using a defined application programming interface (API), such as a northbound API of the network flow controller 120 and/or the security mediation service 150. Packet disposition directives 106 may be received from the security actuator 102 using an inter-process communication mechanism such as pipes, sockets, or the like. For example, packet disposition directives 106 may be received through a secure sockets layer (SSL) communication from the security actuator 102.

The security mediator 172 interfaces with the network security credentials table 156 to validate the sources or "producers" of packet disposition directives 106, and interfaces with the aggregate active state table 166 to maintain the current status of the network security policy as implemented as the set of currently active packet disposition directives. The network security credentials table 156 maintains a trust model for the security mediation service 150, which associates the various sources of packet disposition directives 106 with one or more security roles, packet disposition capabilities, and digital authentication content. As such, the network security credentials table 156 includes data relating to the sources 158, security roles 160, capabilities 162, and digital authentication content 164. The sources 158 may identify particular users, e.g., network administrators, or particular network applications 108, 110, which may submit packet disposition directives 106. The sources 158 may also be referred to by terminology such as "flow rule producers" or "rule insertion requestors." The security roles 160 define particular security roles that may be assigned to the sources 158. Each role 160 has an associated priority, which is used by the security mediation service 150 to resolve flow rule conflicts. In some embodiments, one or more of the roles 160 may be extended with sub-roles according to the requirements of a particular design of the security mediation service 150. In some embodiments, the security roles 160 may include a number of pre-defined roles, e.g.: network administrators, security-related network applications 108, 110, and non-security-related applications 108, 110. For example, in some embodiments, the security role 160 associated with network administrators may be assigned the highest priority. The security role 160 associated with security-related network applications 108, 110 may be assigned an intermediate priority that is lower than the administrator's priority but higher than the priority of other applications. For instance, network security applications may produce flow rules that further constrain the network administrator's static network security policy, based on newly perceived runtime threats or other current network conditions. The lowest-priority security role 160 may be assigned to sources 158 that are non-security-related network applications 108, 110, or that are unidentified (e.g., not digitally authenticated), or that are without an assigned role 160. Each of the roles 160 may be associated with one or more of the capabilities 162. The capabilities 162 define the operations that sources 158 are permitted to perform on the network 100; for example, the capabilities may include the ability to create, modify, or delete flow rules, the ability to create packet-outs, the ability to perform port mods, and the like. The capabilities 162 may be associated with particular roles 160, in some embodiments. As an example, in accordance with the network security credentials 156, a source 158 may be associated with a role 160, and based on the role 160 and/or the digital authentication content 164 associated with the source 158, the source 158 may have certain limited or expanded capabilities 162. The source 158's role 160 and/or capabilities 162 may be determined based at least in part on whether the source 158 has associated digital authentication content 164. For example, in some embodiments, whether a source 158 has capabilities 162 that include the ability to create packet-outs or perform port mods may depend upon whether the source 158's identity has been successfully authenticated. When a packet disposition directive 106 is evaluated by the security mediation service 150, the security mediation service 150 considers the role 160 and/or capabilities 162 associated with the source 158 of the packet disposition directive 106.

The digital authentication content 164 stores information needed to identify and authenticate the sources 158. For example, the digital authentication content 164 may store a public key from a digital certificate associated with each source 158. For network applications 108, 110, the digital authentication content 164 may include an authentication tuple appropriate for the particular network application. For example, an external network application 110 may be identified by an SSL credential, an identity credential, and an SSL connection. In another example, an embedded network application 108 may be identified by a digital certificate and a digitally signed bytecode module.

The aggregate active state table 166 tracks the current state of the security policy on the network 100, as embodied in the set of currently active packet disposition directives 168, as it changes over time during the operation of the network. The aggregate active state table 166 thus stores data relating to the active directives 168, which represent all of the currently accepted packet disposition directives 106 in the dynamically programmable network 100 at any given moment in time. The aggregate active state table 166 also stores data relating to the currently active roles 170, which reference the security roles 160 associated with each of the currently active directives 168. Additionally, the aggregate active state table 166 maintains data relating to the current state of each of the local flow tables 140 of the switches 132, 134, 136 as it changes over time during the operation of the network 100.

The data relating to the active directives 168 may include, for each of the currently active directives 168 that includes a flow rule, a representation of the flow rule that is referred to herein as an alias set reduced format, or "alias set reduced rules." The alias set reduced rules each include an expansion of the flow rule that makes explicit any field substitutions that would result from the application of the flow rule to a data packet to which the rule applies. In a simplified example, each alias set reduced rule includes a representation of the active flow rule itself, a source alias set, a destination alias set, an associated security role 160, and a disposition (e.g., drop, forward, modify, etc.). The source and destination alias sets are expanded representations of the source and destination match fields of the flow rule, respectively, which incorporate, for example, "set" action transformations and wildcards.

The alias sets initially include the values of the source and destination criteria (e.g., IP addresses, network masks, ports, etc.) specified in the match fields of the flow rule. If the rule's action allows another value to be substituted for the initial value of a match field, using, e.g., a "set" action, the resulting value or values are added to the associated alias set. Alias set expansion may continue for related, subsequent flow rules. The initial alias sets for each subsequent flow rule are created for the source and destination match fields as above. These alias sets are then compared to the alias sets of the previous rule. If an alias set intersects with the alias set of the previous rule, the union of the alias sets is used as the alias set for the subsequent rule. As used herein, "intersect" connotes, as in mathematics, the generation of a set that contains all elements of a set A that also belong to another set B (or equivalently, all elements of B that also belong to A), but no other elements. As used herein, "union" connotes, as in mathematics, the generation of a set that contains all elements of a set A and all elements of another set B, but no duplicates. Such expansion is performed for all of the currently active flow rules and stored in the aggregate active state table 166.

For example, Table 1 below illustrates a set of three related flow rules and their associated alias sets. Flow rule 1 matches packets with source a and destination c, and includes an action to set a to a'. Thus, for rule 1, the source alias set is (a, a') and the destination alias set is (c). Rule 2 matches packets with source a' to destination c and includes an action to set c to b. The source alias set for rule 2 is initially (a'), which intersects with the source alias set for rule 1. Thus, the source alias set for rule 2 is (a, a'), the union of the source alias sets of rules 1 and 2. Based on the set action, the destination alias set for rule 2 is (c, b). Lastly, rule 3 matches packets with source a' to destination b and includes an action to forward the data packet. The initial source and destination alias sets are (a') and (b), respectively. These alias sets intersect with the alias sets of rule 2, so the final alias sets of rule 3 are (a, a') and (c, b).

TABLE 1

Flow rules and alias sets.

| # | Rule | Source Alias Set | Destination Alias Set |
|---|------|------------------|------------------------|
| 1 | a → c (set a ⇒ a') | (a, a') | (c) |
| 2 | a' → c (set c ⇒ b) | (a, a') | (c, b) |
| 3 | a' → b forward packet | (a, a') | (c, b) |

Referring now in more detail to the security mediator 172 of FIG. 1, the security mediator 172 receives the packet disposition directives 106 from the security actuator 102 and analyzes each of the packet disposition directives 106 to detect and resolve conflicts with the then-current security policy as expressed by the active directives 168. Acceptable packet disposition directives 106 are added to the active directives 168 and implemented on the switches 132, 134, 136. The illustrative security mediator 172 is embodied as a number of computerized modules and data structures including a role-based source authenticator 174, a state table manager 176, a conflict analyzer 178, and a switch state change detection module 184.

The role-based source authenticator 174 identifies and authenticates the source 158 associated with the packet disposition directive 106 and associates the source 158's role 160 with the packet disposition directive 106. To perform such authentication and validation, the role-based source authenticator 174 may reference the network security credentials table 156.

The state table manager 176 manages and maintains the current state of the aggregate active state table 166 and/or the network security credentials table 156 as flow rules and/or other directives are added, modified, and deleted from the set of currently active directives. The state table manager 176 may operate in conjunction with the switch state change detection module 184, so that the aggregate active state table 168 remains synchronized with the local flow tables 142, 144, 146 at the network switches 132, 134, 136.

The conflict analyzer 178 determines, "live"—that is, when a packet disposition directive 106 is received at the security mediator 172—whether to instantiate a packet disposition directive 106 based on its associated role 160. For packet disposition directives 106 containing flow rule insertion requests (e.g., candidate flow rules), the conflict analyzer 178 may compare each candidate flow rule to the set of existing active directives 168. Such comparison may detect one or more rule conflicts, including rule conflicts involving dynamic flow tunneling. As used herein, a "rule conflict" arises when a candidate flow rule seeks to enable a network flow that is otherwise prohibited by the existing currently active directives 168, or a candidate flow rule seeks to disable a network flow that is otherwise allowed by the existing currently active directives 168. For example, conflicts can include contradictory or inconsistent rules. Any conflicts between candidate flow rules and existing active directives 168 are resolved in accordance with the network security policy. In some embodiments, conflict detection and conflict resolution may be performed by sub-modules of the conflict analyzer 178, for example by a conflict detection module 180 and/or a conflict resolution module 182.

The switch state change detection module 184 communicates messages received from the switches 132, 134, 136 relating to the status of the local flow tables 140 of each switch 130. In particular, the switch state change detection module 184 may provide an interface by which the aggregate active state table 166 is updated when any the switches 132, 134, 136 perform rule expiration. In some embodiments, the switch state change detection module 184 may implement a callback routine to receive messages from the switches 132, 134, 136 and coordinate the state of the switches 132, 134, 136 with the aggregate active state table 166. For example, a switch 130 may reject or refuse flow rule updates when resources of the switch 132, 134, 136, such as the local flow tables 142, 144, 146 are exhausted. In such event, the switch 130 may send a message to the switch state change detection module 184 signaling such rejection. In other embodiments, a switch 130 may delete a flow rule based on the expiration of a defined amount of time (e.g., a "timeout") and send a message signaling the deletion to the switch state change detection module 184. The switch state change detection module 184 receives such messages and updates the aggregate active state table 166 accordingly.

Figure 2:
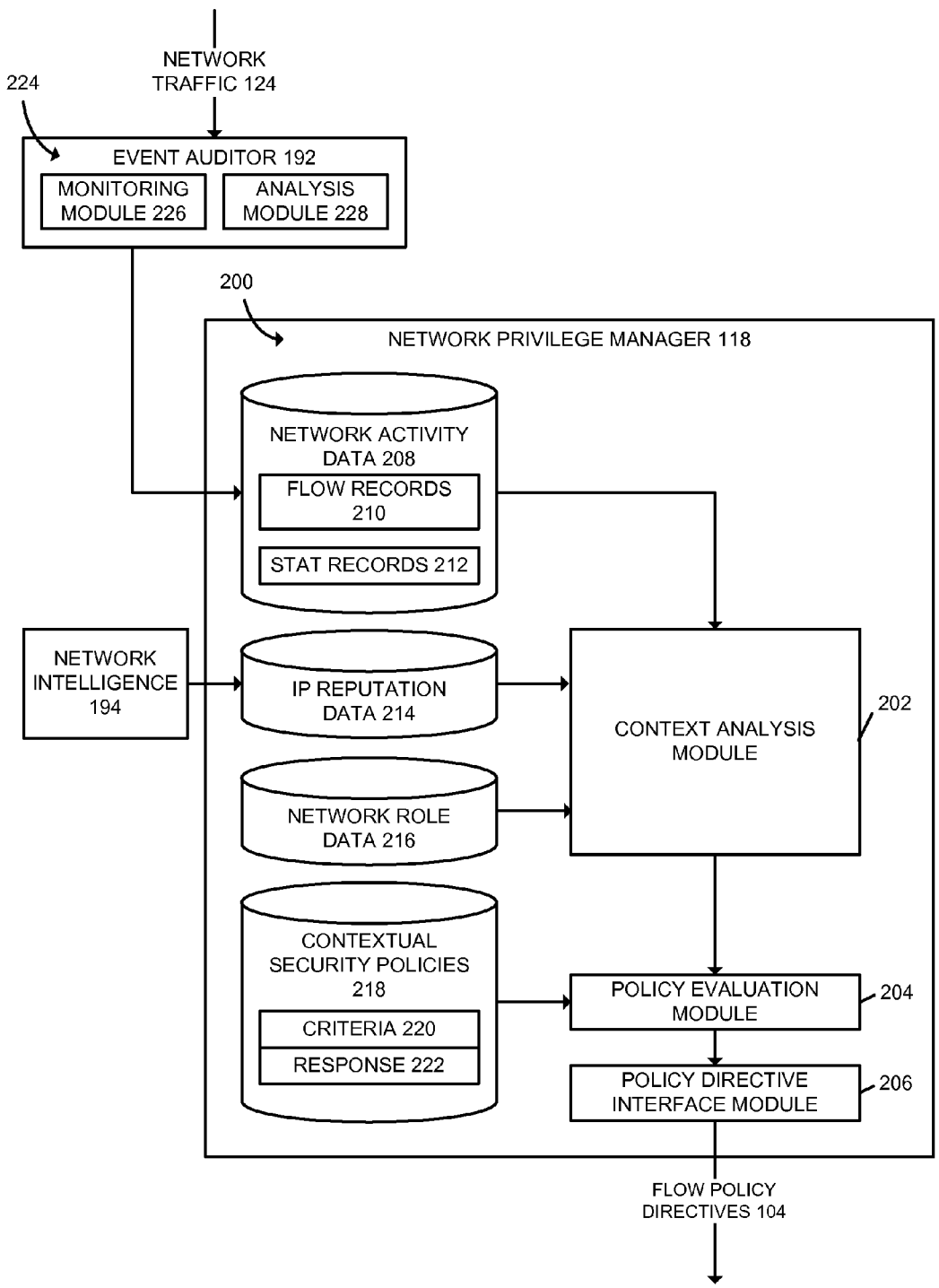
FIG. 2 is a simplified block diagram of at least one embodiment of an environment that may be established by the network privilege manager of FIG. 1.

Referring now to FIG. 2, in the illustrative embodiment, the network privilege manager 118 establishes an environment 200 during operation (e.g., a native or virtual execution or "runtime" environment). The illustrative environment 200 includes a context analysis module 202, a policy evaluation module 204, and a policy directive interface module 206. The various modules of the environment 200 may be embodied as hardware, firmware, software, or a combination thereof.

The context analysis module 202 is configured to determine the current network context of the dynamically programmable computer network 100. The current network context is indicative of the dynamic properties of the network traffic 124; that is, the current network context depends on, e.g., the current behavior of hosts on the network 100. The context analysis module 202 may determine the current context based on any combination of network activity data 208, IP reputation data 214, and/or network role data 216. For example, the context analysis module 202 may periodically determine the current version of IP reputation data 214, current network activity data 208, or the current version of the security policy, at a given time instance, and update or initiate updating of the criteria 220 and/or the responses 222, described below, in response to updates or modifications of the IP reputation data 214, the current network activity data 208, or the security policy.

The network activity data 208 is indicative of one or more network flows identified within the network traffic 124. The network activity data 208 may further include a number of flow records 210 and stat records 212. The flow records 210 may include data describing attributes, statistics, counters, or other data relating to individual network flows within the network traffic 124. The stat records 212 may include data representing aggregate statistics describing network activity for the entire network 100 during a discrete time interval. The network activity data 208 may be generated by the event auditor 192, as further described below.

The IP reputation data 214 includes a list of known malicious Internet addresses and associated data describing the malicious address, the type of threat, and other information relating to the trustworthiness of the malicious Internet address. For example, the IP reputation data 214 may be embodied as a large-scale network address blacklist. Alternatively or in addition, the IP reputation data 214 includes a list of Internet addresses and associated data describing addresses that are known to be acceptable or permitted in accordance with the security policy (e.g., a whitelist). Collectively or individually, the various types of IP reputation data 214 may be referred to as access control data. The IP reputation data 214 may be provided by the network intelligence 194, described above.

The network role data 216 may define abstract network roles and associate the network roles with particular addresses, subnets, or other address specifiers. The network role data 216 may be prepared by a network administrator to correspond to the topology or other design of the network 100. For example, the network role data 216 may group addresses into types of machines (e.g., workstation, server, peripheral device, etc.). As another example, the network role data 216 may segment the network 100 into functional tiers or zones (e.g., web tier, database tier, application tier, etc.).

The policy evaluation module 204 is configured to select contextual security policies 218 that match the current network context and generate flow policy directives 104 based on the matching contextual security policies 218. Each contextual security policy 218 may define a number of matching criteria 220 and an associated action or response 222. The criteria 220 may match any aspect of the current network context, including matching current network activity data 208, IP reputation data 214, or network role data 216. Alternatively or in addition, the criteria 220 may specify matching thresholds. If a threshold is specified, more than one match may be required before the associated response 222 is triggered. For example, the criteria 220 may specify that three matches are required in less than sixty seconds before the response 222 is triggered. The criteria 220 may also specify fields to be tracked for each threshold. For example, the criteria 220 may specify that the three matches must also include matching source addresses. The response 222 may specify any network security response, including responses that may be mapped to flow policy directives 104 as well as other responses, such as logging information, issuing a warning, executing an arbitrary shell command, or other response.

The policy directive interface module 206 is configured to transmit the flow policy directives 104 produced in response to the contextual security policies 218 to the security actuator 102. The policy directive interface module 206 may transmit the flow policy directives 104 in any appropriate format. For example, the policy directive interface module 206 may convert flow policy directives 104 expressed in an event log format into a textual command understood by the security actuator 102.

Still referring to FIG. 2, in the illustrative embodiment, the event auditor 192 establishes an environment 224 during operation (e.g., an execution or "runtime" environment). The illustrative environment 224 includes a monitoring module 226 and an analysis module 228. The various modules of the environment 224 may be embodied as hardware, firmware, software, or a combination thereof.

The monitoring module 226 is configured to passively monitor the network traffic 124 passing through the switches 130 (using, e.g., one or more network sensors). The analysis module 228 is configured to generate the network activity data 208 based on the network traffic 124. The analysis module 228 may identify network flows within the network traffic 124, generate flow records 210 corresponding to the network flows, and/or periodically generate stat records 212 based on the network traffic 124. The event auditor 192 may submit the network activity data 208 to the network privilege manager 118 in any suitable format. For example, in some embodiments, the event auditor 192 may output the network activity data 208 to a file or stream in the comma separate valued (CSV) format.

Figure 3:
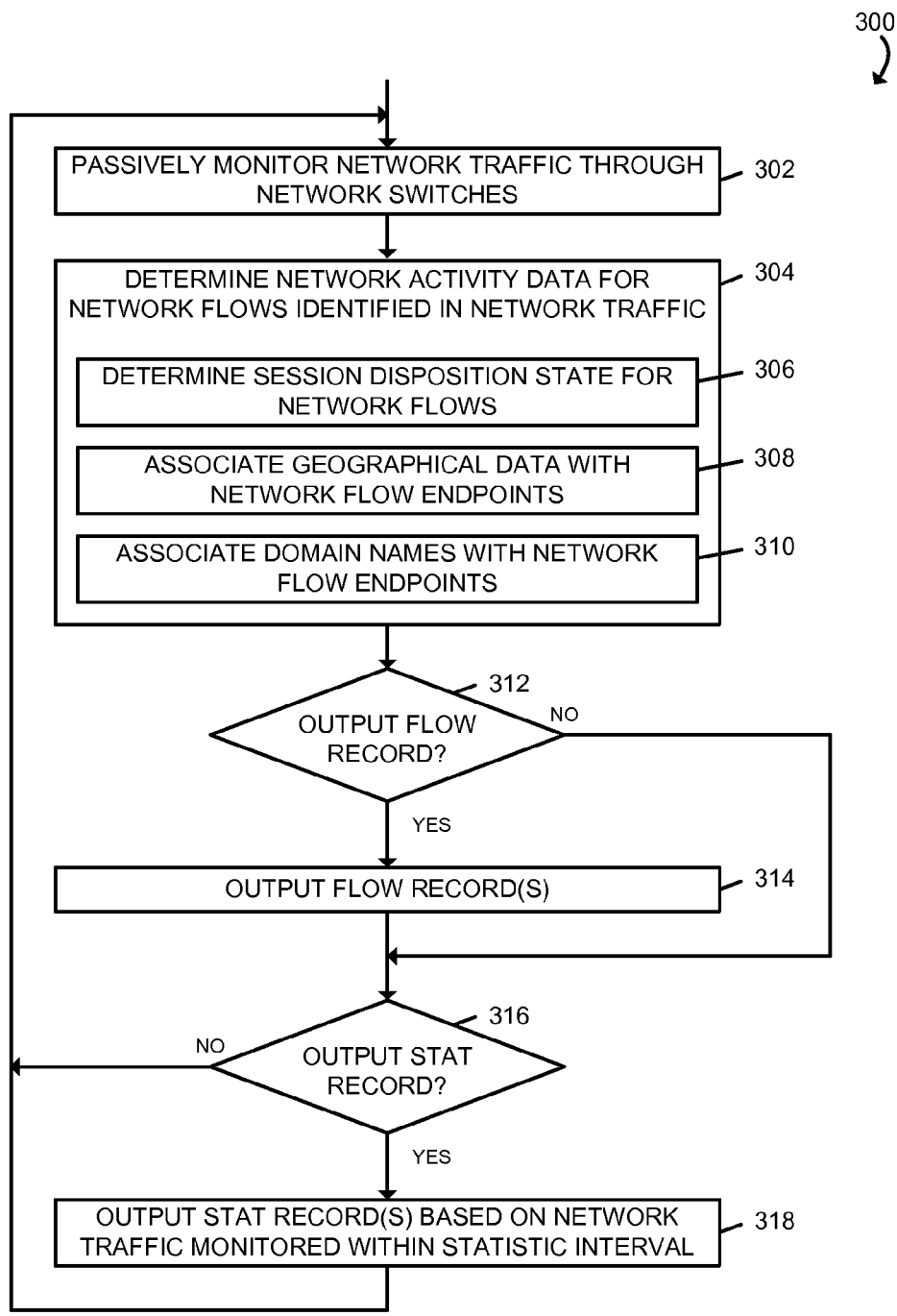
FIG. 3 is a simplified flow diagram of at least one embodiment of a method by which an event auditor of FIGS. 1 and 2 may generate network activity data for the dynamically programmable network.

Referring now to FIG. 3, an illustrative method 300 for generating network activity data 208 by the event auditor 192 is shown. The method 300 may be embodied as computerized programs, routines, logic, and/or instructions of a computing system, e.g., hardware, firmware, software or a combination thereof, as part of the event auditor 192, for example. The method 300 begins in block 302, in which the event auditor 192 passively monitors network traffic 124 passing through the switches 130. The event auditor 192 may use any method for monitoring, logging, collecting, or otherwise receiving data describing the flow of data through the switches 130. For example, the event auditor 192 may receive copies of network traffic 124 forwarded from the switches 130 via a specialized monitoring port of each switch 130, such as a Switched Port Analyzer (SPAN) port. The illustrative event auditor 192 also monitors the network for security policy updates, blacklist updates, and whitelist updates. To do this, the event auditor 192 may periodically check for modifications to the policy, blacklist, and whitelist files by e.g., comparing a current date/time stamp to a previous date/time stamp of the file). The event auditor 192 may perform the periodic monitoring of policy, blacklist, and/or whitelist files concurrently with its network traffic monitoring (e.g., on a separate thread), and/or concurrently with operations of the network privilege manager 118.

In block 304, the event auditor 192 determines network activity data 208 for network flows identified in the network traffic 124. The network activity data 208 may include any attributes, statistics, counters, or other data describing a network flow. For example, the network activity data may include the source and destination Internet address (e.g., the IP addresses associated with the TCP session initiator and TCP server, respectively), the source and destination port, protocol (e.g., TCP or UDP (User Datagram Protocol), start time, end time, or duration. The network activity data 208 may include statistical information on data transferred, including the number of zero-length packets sent by the client or the server, the number of nonzero-length packets (i.e., data packets) sent by the client or the server, the total number of bytes produced by the client or the server, the total number of packets produced by the client or the server, or the average size of data packets produced by the client or the server.

In block 306, the event auditor 192 may determine a session disposition state for each network flow identified in the network traffic 124. The session disposition state may correspond to a connection state for a connection-based protocol such as TCP, or may be determined by the event auditor 192 for a connectionless protocol such as UDP. The connection state may indicate whether the network flow is being initialized (INIT), whether the network flow is open, ongoing, or otherwise transmitting data (UPDATE), whether the network flow is finalized, closing, or closed, (FIN) or whether the network flow is or has been reset by the client or the server (CL_RST or SRV_RST).

In block 308, the event auditor 192 may associate geographical data with the endpoints (i.e., the client and server) of the identified network flows. The geographical data may include any data describing the physical location of an endpoint, such as the country name, country code, city, or geographical coordinates. The event auditor 192 may determine the geographical data using, for example, an IP geolocation database such as MaxMind® GeoIP®. In some embodiments, the event auditor 192 may be configured not to perform geographical lookups, for example to increase performance or conserve bandwidth.

In block 310, the event auditor 192 may associate domain names with the endpoints of the identified network flows. In some embodiments, the event auditor 192 may associate the network flows with domain names observed in a previous DNS (Domain Name System) query. Additionally or alternatively, in some embodiments the event auditor 192 may perform an independent DNS query to identify the domain names.

After generating the network activity data 208, in block 312 the event auditor 192 determines whether to output one or more flow records 210 of the network activity data 208. The event auditor 192 may determine whether to output flow records 210 on a per-flow basis. For example, the event auditor 192 may output a flow record 210 for a network flow when the network flow has exceeded a threshold number of bytes transferred, a threshold number of packets transferred, or a threshold duration. The particular threshold values used may be configured, for example, by a network administrator. If the event auditor 192 determines not to output any flow records 210, the method 300 skips ahead to block 316, described below. If the event auditor 192 determines to output one or more flow records 210, the method 300 advances to block 314.

In block 314, the event auditor 192 outputs one or more flow records 210 associated with the identified network flows. The flow record 210 describes all of the network activity data associated with the network flow, including the statistical data, session disposition state, geographical data, domain names, and other data, as described above. The flow record 210 may be output in any appropriate format for recording or transferring data. For example, in some embodiments, each flow record 210 may be output as a record in a comma-separated value (CSV) file. Each output flow record 210 may include a type identifier to identify the record as a flow record 210. For example, when output as a CSV record, the first field of each flow record 210 may include "FLOW" to identify the flow record 210. As further described below in connection with FIG. 4, the output flow records 210 may be processed by the network privilege manager 118 to determine the current context of the dynamically programmable computer network 100.

In block 316, after outputting any flow records 210, the event auditor 192 determines whether to output any stat records 212. The event auditor 192 may output stat records 212 at regular, predefined intervals. The stat record 212 interval may be configured by a network administrator. In some embodiments, stat record 212 output may be disabled completely. If no stat records 212 are to be output, the method 300 loops back to block 302 to continue passively monitoring the network traffic 124. If one or more stat records 212 are to be output, the method 300 advances to block 318.

In block 318, the event auditor 192 outputs one or more stat records 212 based on the network traffic 124 monitored within the stat record 212 interval. Each stat record 212 may include aggregate statistics describing network activity for the entire network 100 during the stat record 212 interval. The stat record 212 may provide data on outbound network traffic 124, that is, network flows having a source address within a home network, and inbound network traffic, that is, network flows having a source address outside the home network. The home network may be configured by a network administrator, for example, as a list of netmasks. For example, each stat record 212 may include data describing, for the stat record 212 interval, the number of IP packets originating inside or outside of the home network, the number of inbound or outbound TCP flows, the number of inbound or outbound TCP packets, the inbound or outbound TCP byte count, the number of inbound or outbound UDP packets, the inbound or outbound UDP byte count, the number of inbound or outbound unresponded SYN packets (i.e., pending SYNs), or the number of inbound or outbound unsolicited ACK packets. As used herein, SYN may refer to, among other things, the first packet sent across a TCP connection (e.g., a "synchronize" packet). A signal passed between communicating processes or computers to signify acknowledgement, or receipt of response, as part of a communications protocol, may be referred to as an ACK packet. In response to an ACK PACKET, a server may reply with a SYN-ACK packet. For example, ACK packets are used in the Transmission Control Protocol (TCP) to acknowledge the receipt of SYN packets when establishing a connection, data packets while a connection is being used, and FIN packets when terminating a connection.

Similar to the flow records 210, the stat records 212 may be output in any appropriate format for recording or transferring data, including as records in a CSV file. Each output stat record 212 may include a type identifier to identify the record as a stat record 212. For example, when output as a CSV record, the first field of each stat record 212 may include "STATS" to identify the stat record 212. As further described below in connection with FIG. 4, the output stat records 212 may be processed by the network privilege manager 118 to determine the current context of the dynamically programmable computer network 100. After outputting any stat records 212, the method 300 loops back to block 302 to continue passively monitoring the network traffic 124.

Figure 4:
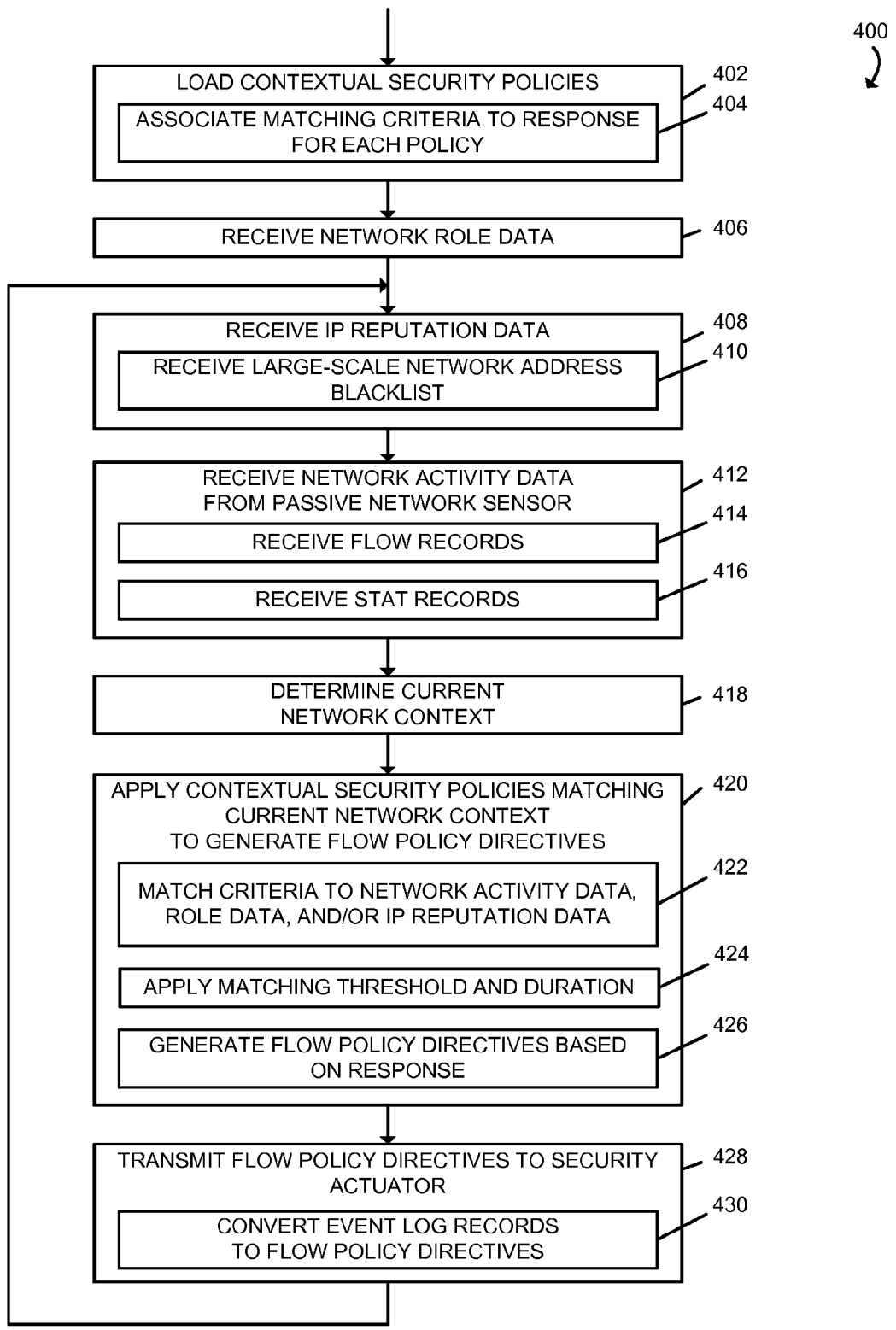
FIG. 4 is a simplified flow diagram of at least one embodiment of a method by which the network privilege manager of FIGS. 1 and 2 may manage network privileges in the dynamically programmable network.

Referring now to FIG. 4, a method 400 for managing network privileges is shown. The method 400 may be embodied as computerized programs, routines, logic, and/or instructions of a computing system, e.g., hardware, firmware, software, or a combination thereof, as part of the network privilege manager 118, for example. The method 400 begins in block 402, in which the network privilege manager 118 loads a number of contextual security policies 218. The contextual security policies 218 define network security policy for the dynamically programmable computer network 100, and may be provided or configured by a network administrator. The contextual security policies 218 may be embodied as any appropriate data format, including, for example, as one or more extensible markup language (XML) files.

In block 404, the network privilege manager 118 may associate a number of matching criteria 220 with a response 222 for each contextual security policy 218. As further described below, each contextual security policy 218 may specify a set of criteria 220 to be matched against the dynamic network context of the dynamically programmable computer network 100. Each contextual security policy 218 may also specify a response 222 to be generated when matching traffic is encountered. The response 222 may include any directive, command, handling decision, or other action to enforce network security policy. For example, the response 222 may be embodied as a directive to drop all flows matching the criteria, block a particular address, quarantine a particular address, redirect flows from a particular address, ignore all records matching the criteria, produce a warning for each record matching the criteria, log each record matching the criteria, execute an arbitrary shell command, or any other action.

In block 406, the network privilege manager 118 receives network role data 216. The network role data 216 associates particular addresses, network masks, subnets, or other network identifiers with abstract network roles. Example roles may include workstation, peripheral, application server, network device, ignored device, infrastructure asset, or any other network role that may be defined by a network administrator. Network roles may be defined hierarchically or otherwise tailored to particular network topologies. For example, network roles may be grouped into one or more super-roles or tiers (e.g., a web tier, application tier, and database tier). The network role data 216 may be configured by a network administrator, for example using one or more configuration files.

In block 408, the network privilege manager 118 may receive access control data such as IP reputation data 214 from the network intelligence 194. In some embodiments, in block 410 the network privilege manager 118 may receive a large-scale network address blacklist including a number of malicious IP addresses or a large-scale network address whitelist including a number of acceptable IP addresses. Along with the malicious or acceptable IP address, as the case may be, the IP reputation data 214 may also identify other data associated with the IP address, such as one or more threat types associated with a malicious address. The threat types may identify the malicious address as associated with, for example, a malware drive-by exploit site, an Internet site associated with malware, a malware command and control site, an aggressive Internet scanner, a site associated with email abuse or spam, a malicious advertisement site, or any other threat type. Also, the IP reputation data 214 may include other data associated with the malicious IP address, such as the associated Internet service provider, domain name, ASN (Autonomous System Number) numeric code, AS (Autonomous System) identity, estimated network speed, geographical data, or business sector. In some embodiments, the IP reputation data 214 may include corroboration data indicating whether other worldwide data sources have also identified the malicious IP address as associated with malware, ASN threat percentile data indicating the relative percentile of malicious IP addresses concentrated within the ASN, or an indication of whether the domain associated with the malicious IP has been created within the last thirty days. The IP reputation data 214 may be updated regularly (e.g., daily) or as new threats are identified.

In block 412, the network privilege manager 118 receives network activity data 208 from the event auditor 192. As described above, the network activity data 208 may include any attributes, statistics, counters, or other data describing the network flows identified in the network traffic 124. In some embodiments, in block 414 the network privilege manager 118 may receive one or more flow records 210 from the event auditor 192. As described above, each flow record 210 may include data describing a particular network flow. In some embodiments, in block 416 the network privilege manager 118 may receive one or more stat records 212 from the event auditor 192. As described above, each stat record 212 may include data describing aggregate network activity for the entire network 100 during the stat record interval.

In block 418, the network privilege manager 118 determines the current network context of the dynamically programmable computer network 100. The current network context may include any data or relationship associated with the current dynamic state of the network flows within the network traffic 124. The current network context thus may be based on any combination of the current network activity data 208, the IP reputation data 214, and/or the network role data 216.

In block 420, the network privilege manager 118 applies the contextual security policies 218 matching the current network context to generate one or more flow policy directives 104. In block 422, the network privilege manager 118 may select applicable contextual security policies 218 by finding contextual security policies 218 including criteria 220 that match the current network activity data 208, the IP reputation data 214, and/or the network role data 216. Thus, the current network context may be expressed by the criteria 220 associated with a contextual security policy 218. In block 424, the network privilege manager 118 may apply a matching threshold and/or duration to the applicable security policies 218. The matching threshold and duration may require that at least a certain number of network flows must be matched within a given duration prior to triggering the associated response 222. In some embodiments, the network privilege manager 118 may also track certain network flow fields (e.g., address fields) when applying the matching threshold. For example, the network privilege manager 118 may require a threshold number of matching network flows originating from the same source address to trigger the associated response 222. In block 426, the network privilege manager 118 may generate one or more flow policy directives 104 based on the response 222 associated with each matching contextual security policy 218. For example, the network privilege manager 118 may map the response and associated parameters onto one or more flow policy directives 104.

In block 428, the network privilege manager 118 transmits the flow policy directives 104 to the security actuator 102. As described above, the security actuator 102 converts the flow policy directives 104 into a number of packet disposition directives 106 that control the flow of traffic over the network 100. The network privilege manager 118 may transmit the flow policy directives 104 using any format, transport, or protocol usable by the security actuator 102. For example, in some embodiments the network privilege manager 118 may generate event log entries for matching criteria and associated responses. The event log entries may be formatted in any convenient log file format, such as the ArcSight Common Event Format (CEF) used by many system logging tools. In block 430, in some embodiments the network privilege manager 118 may convert event log records into flow policy directives 104 to be transmitted to the security actuator 102. For example, the network privilege manager 118 may monitor a CEF log for CEF events and generate flow policy directives 104 as events are created. After transmitting the flow policy directives 104 to the security actuator 102, the method 400 loops back to block 408 to continue monitoring network context of the network 100.

Example Usage Scenarios

Referring now to FIG. 5, pseudocode 500 illustrates sample XML code for a number of contextual security policies 218. In the illustrative XML code 500, three contextual security policies 218 are defined by a single policy element 502. The responses 222 and criteria 220 associated with those contextual security policies 218 are defined by response elements 504, 508, 512 and the included criteria elements 506, 510, 514.

Consider a contextual security policy 218 to block traffic originating from local workstations destined to malicious webservers. The response element 504 includes an action attribute defining the response 222 to be "BLOCK %SrcIP." The %SrcIP parameter may refer to a macro that is expanded with the source IP address of matching network flows. The criteria element 506 includes a number of attributes defining criteria 220 for matching against network flows. In the illustrative example, the criteria 220 match flows that are blacklisted (i.e., flows with an endpoint included in the IP reputation data 214), from a source address included in the workstation role, and to a destination port that is associated with web traffic. The "%webPort" attribute may refer to a macro that is expanded into a predefined list of web traffic ports, for example provided by a network administrator. As illustrated, the threshold attribute may be shorthand syntax to define the matching threshold count, threshold duration in seconds, and fields by which to track the threshold. Thus, the threshold attribute indicates that, for the response 222 to be triggered, three network flows must be matched within sixty seconds, tracked by the source address and destination address. In use, the contextual security policy 218 as defined by the response element 504 and the criteria element 506 may allow an individual workstation to access malicious webservers infrequently, but block the workstation when attempting to contact three or more malicious webservers within a minute. Because the matching threshold is tracked by source IP address and destination IP address, matching flows from several workstations (e.g., three workstations to one malicious webserver each) may not trigger the response 222.

Consider another contextual security policy 218 to warn of excessive connection resets between an internal database tier and application server tier. The response element 508 includes an action attribute defining the response to be "WARN," which may generate a warning using any appropriate technology. For example, a warning may be inserted into a system log, a message may be generated, or any other warning may be issued. The criteria element 510 includes a number of attributes defining criteria 220 for matching network flows. The criteria 220 match network flows from a source address in the application tier role to the database tier role. The "%appTier" and "%DBTier" attribute values may refer to macros that are expanded with network addresses or netmasks corresponding to the network role data 216. The criteria 220 further match flows with destination ports included in "%DB_Ports," which may refer to a macro that is expanded to a number of predefined ports associated with database traffic. The criteria 220 further match flows in the CL_RST or SRV_RST states, that is, flows that have been or are being reset by either the client or server. Excessive resets may indicate network problems such as crashed servers, software bugs, or excessive load or may indicate malicious activity. The threshold count attribute and threshold seconds attribute indicate that the response 222 may be triggered when network flows are matched more than three times within sixty seconds. Note that unlike the previous contextual security policy 218, the criteria element 510 does not specify any fields by which to track the matching threshold. Thus, the response 222 may be triggered for any matching flows (e.g., three reset connections involving different servers in the database tier).

Consider a third contextual security policy 218 to allow BitTorrent traffic if the network 100 is not too congested. The response element 512 includes an action attribute defining the response to be "DENY," which may generate a deny directive to drop all traffic corresponding to matching network flows. The criteria element 514 includes a number of attributes defining criteria 220 for matching network flows. The criteria 220 match network flows from a source address in the "% External" role to a destination address in the "%BitTorrentServers" role and a destination port defined in "%BitTorrentPorts." In other words, the criteria 220 match network flows originating from outside the network 100 and destined to a known BitTorrent server within the network 100. The criteria 220 further match flows in the INIT state, that is, newly initiated flows. The criteria 220 further match when the inbound TCP flow count is greater than 2000. As described above, the inbound TCP flow count may be included in one or more stat records 212 and thus may be based on aggregate data for all network flows identified in the network traffic 124. Therefore, the response 222 may be triggered to block BitTorrent initialization requests when more than 2000 inbound TCP flows to any service, not limited to BitTorrent, exist. Note that existing network flows to BitTorrent servers (e.g., network flows in the UPDATE state) may not be affected by this contextual security policy 218.

Another example of a contextual security policy 218 is shown in Code Example 1 below.

Code Example 1. "Cascading" Rules and Actions.

```
<ACTION markflow="ACTION1,srcip"
Print="FLOWALERT,%Description,...">
    <Criteria cid="1"
    Marked="!~ACTION1"
    Description="Cascade RULE 1: A NON-WEB DATAFLOW INITIATED from XX to a workstation"
    SrcCountry="XX"
    DstIP="%Workstations"
    </ACTION>
<ACTION markflow="ACTION2,srcip"
    BAD_ACCESS="%DstIP"
Print="FLOWALERT,%Description,...">
    <Criteria cid="1"
    Marked="ACTION1"
    Description="Cascade RULE 2: A NON-WEB DATAFLOW INITIATED from XX that also did ACTION1"
    SrcCountry="XX"
    DstIP="%TheyShouldntBeHere"
    </ACTION>
<ACTION markflow="ACTION3,srcip"
```

-continued

Code Example 1. "Cascading" Rules and Actions.

```
Print="FLOWALERT,%Description...">
    <Criteria cid="3"
    Marked="ACTION2"
    Description="Cascade RULE 3: A NON-WEB DATAFLOW
INITIATED from XX that also did ACTION2"
    SrcCountry="XX"
    DstIP="%TheyReallyShouldntBeHere"
    </ACTION>
```

As noted above, a security policy can include multiple sets of rules or sub-policies, where each rule or policy includes one or more criteria and an action or response. Rules and policies can be organized in groups, and arranged in a particular order so that certain sets or groups of rules or policies are executed before others (e.g., negative criteria may be executed before positive criteria). Code Example 1 is an example of pseudocode for a security policy that includes a set of "cascading" rules and actions. In this example, the execution of an action by one rule affects the application of one or more other rules in the policy. For example, the fact that an action is executed as a result of a comparison of a current network context to a one or more first criteria subsequently affects (e.g., updates) the current network context, which is then used as input to a subsequent rule.

In the above example, the first policy checks to see if any source IP address from a specified country are attempting to initiate communications with a particular workstation (ACTION1). If so, the action of generating an alert is executed. The next policy says, if ACTION1 has occurred, and the same source IP address is now trying to get to a machine that it shouldn't (%TheyShouldntBeHere) then create an alert for this and mark this flow (from the source IP address from the specified country to the workstation) with ACTION2. The last policy says that if ACTION2 has occurred from the same source IP address, and now that same source IP address has actually obtained access to a %TheyReallyShouldntBeHere machine (ACTION3), then generate an alert. In this way, cascading rules can allow network activity to be monitored until it reaches a level of severity that, according to the security policy, should result in an action being taken.

Implementation Examples

Figure 6:
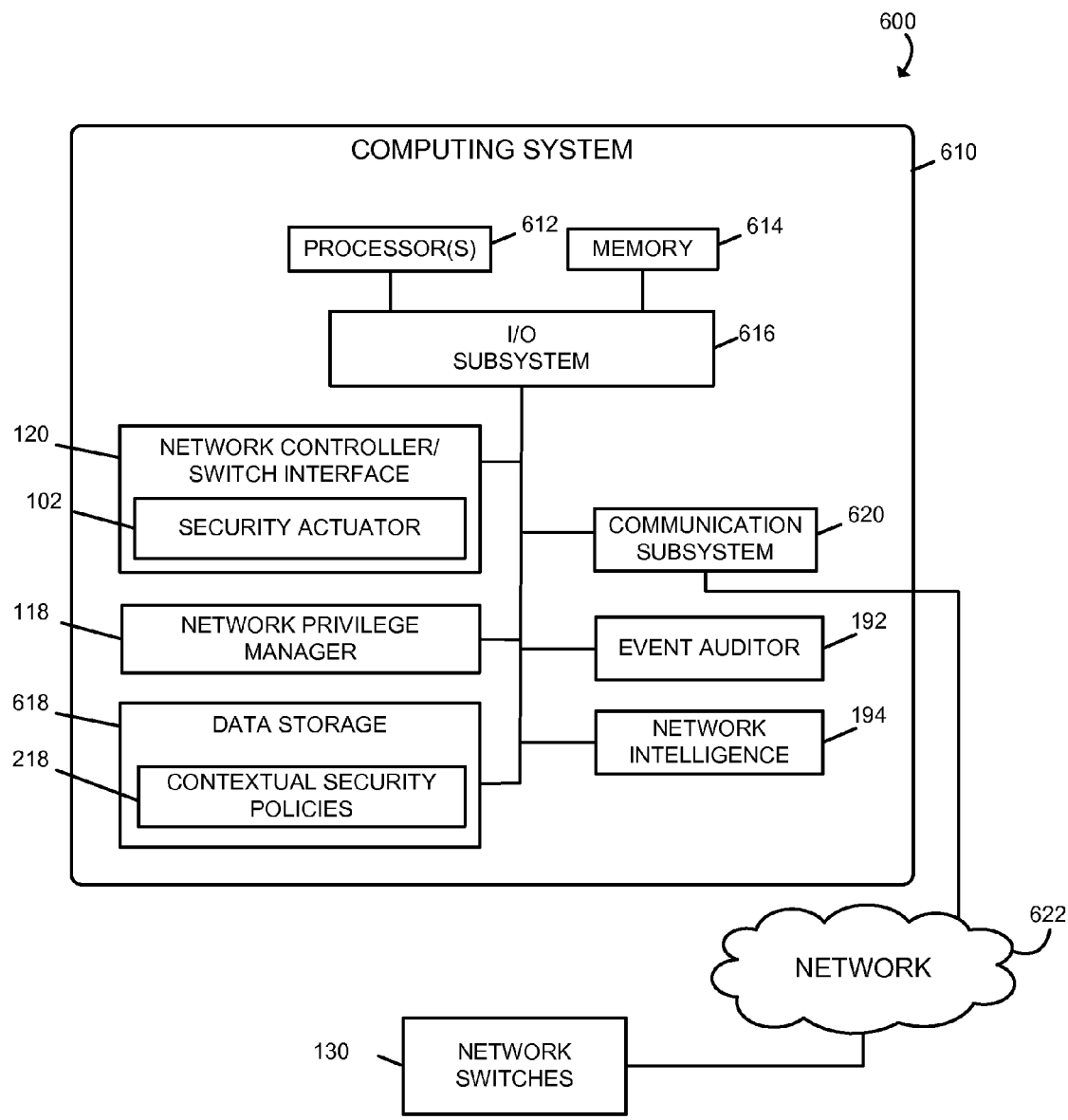
FIG. 6 is a simplified block diagram of an exemplary computing environment in connection with which at least one embodiment of the network privilege manager of FIGS. 1 and 2 may be implemented.

Referring now to FIG. 6, a simplified block diagram of an exemplary computing environment 600 in which the network privilege manager 118 and/or the event auditor 192 may be implemented, is shown. The illustrative environment 600 includes a computing system 610, which may implement the network flow controller 120, the network privilege manager 118, the event auditor 192, and/or the network intelligence 194 on a single computing device or multiple computing devices that are coupled to the network 100 (shown as a network 622 in FIG. 6).

The illustrative computing system 610 includes at least one processor 612 (e.g. a microprocessor, microcontroller, digital signal processor, etc.), memory 614, and an input/output (I/O) subsystem 616. The computing system 610 may be embodied as any type of computing device(s) such as a personal computer (e.g., desktop, laptop, tablet, smart phone, body-mounted device, etc.), a server 190, an enterprise computer system, a network of computers, a combination of computers and other electronic devices, or other computing devices. Although not specifically shown, it should be understood that the I/O subsystem 616 typically includes, among other things, an I/O controller, a memory controller, and one or more I/O ports. The processor 612 and the I/O subsystem 616 are communicatively coupled to the memory 614. The memory 614 may be embodied as any type of suitable computer memory device (e.g., volatile memory such as various forms of random access memory).

The I/O subsystem 616 is communicatively coupled to a number of components including one or more data storage devices 618 and a communication subsystem 620. Although not specifically shown, one or more user input devices (e.g., keyboard, touch screen, etc.) and output devices (e.g., a display) may be coupled to the I/O subsystem 616 to allow a human operator, such as a network administrator, to, for example, establish and update a network security policy. The data storage 618 may include one or more hard drives or other suitable data storage devices (e.g., flash memory, memory cards, memory sticks, and/or others). In some embodiments, some or all of the contextual security policies 218 processed by the network privilege manager 118 and/or the network activity data 208 generated by the event auditor 192 may reside in the data storage device 618. In some embodiments, portions of systems software (e.g., an operating system, etc.), framework/middleware (e.g., APIs, object libraries, etc.), the network privilege manager 118, and/or the event auditor 192 reside at least temporarily in the data storage device 618. Portions of systems software, framework/middleware, the network privilege manager 118, and/or the event auditor 192 may be copied to the memory 614 during operation of the computing system 610, for faster processing or other reasons. In some embodiments, portions of the network privilege manager 118 and/or the event auditor 192 may be distributed across multiple computing devices (e.g., servers 190) on the network 100.

The communication subsystem 620 communicatively couples the computing system 610 to the network 622, which may be a local area network, wide area network, personal cloud, enterprise cloud, public cloud, and/or the Internet, for example. Accordingly, the communication subsystem 620 may include one or more wired or wireless network interface cards or adapters, for example, as may be needed pursuant to the specifications and/or design of the particular computing system 610. The communication subsystem 620 may be used by the network flow controller 120 to communicate with the network switches 132, 134, 136 in order to control and define the dynamically programmable network 100. For example, the communication subsystem 620 may include one or more dedicated control channels for communication with one or more of the network switches 132, 134, 136.

The computing system 610 may include other components, sub-components, and devices not illustrated in FIG. 6 for clarity of the description. In general, the components of the computing system 610 are communicatively coupled as shown in FIG. 6 by electronic signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a method for managing network privileges in a dynamically programmable computer network includes, with at least one computing device: monitoring, over time, network activity data, the network activity data being a function of network traffic of the dynamically programmable computer network, the network activity data indicative of one or more network flows within the network traffic; updating, over time, access control data, the access control data indicating one or more of: acceptable network flows and unacceptable network flows over the network; at a time instance, determining a current network context based on the network activity data, the current network context indicative of one or more network flows of the dynamically programmable computer network; at the time instance, determining a current version of the access control data; using the current version of the access control data, comparing the current network context to a security policy, the security policy defining a criterion for determining whether to execute an action in response to the current network context and an action to execute if the current network context matches the criterion; and execute the action to control flow of communications across the dynamically programmable computer network based on the comparison of the current network context to the criterion including the current version of the control data.

An example 2 includes the subject matter of example 1 and includes selecting the security policy from a number of possible security policies based on the criterion matching the current network context more than a predefined threshold number of times within a predefined time period. An example 3 includes the subject matter of example 1 or example 2 and includes selecting the security policy from a number of possible security policies based on the criterion matching an event count within an update interval, the event count generated as a function of aggregated inbound network traffic or outbound network traffic. An example 4 includes the subject matter of any of examples 1-3 and includes receiving network role data describing a role associated with one or more hosts of the dynamically programmable computer network; wherein determining the current network context includes determining a role associated with an endpoint of a network flow within the network traffic. An example 5 includes the subject matter of any of examples 1-4, wherein the access control data includes Internet Protocol (IP) reputation data received from a network intelligence server, the IP reputation data identifying a plurality of malicious network addresses; and determining the current network context includes determining whether a network flow within the network traffic is associated with a malicious network address identified by the IP reputation data in the current version of the access control data. An example 6 includes the subject matter of any of examples 1-5, wherein the IP reputation data includes a threat type associated with each of the plurality of malicious network addresses. An example 7 includes the subject matter of any of examples 1-6, wherein the action of the contextual security policy includes a drop response, a block response, a quarantine response, or a redirect response. An example 8 includes the subject matter of any of examples 1-7 and includes, in response to executing the action, modifying the current network context and evaluating the modified current network context with another security policy. An example 9 includes the subject matter of any of examples 1-8, wherein the security policy includes a plurality of different criterion, and includes comparing the current network context to first criterion of the security policy, executing an action associated with the current network context matching the first criterion, updating the current network context in response to executing the action, and comparing the updated current network context to second criterion of the security policy. An example 10 includes the subject matter of any of examples 1-9 and includes receiving the security policy in a human-intuitive format and converting the security policy to a plurality of criteria and a plurality of actions associated with one or more of the criteria. An example 11 includes the subject matter of any of examples 1-10 and includes, at the time instance, determining a current version of the security policy and comparing the current network context to the current version of the security policy.

In an example 12, a network privilege manager for a dynamically programmable computer network, the network privilege manager embodied in one or more computer readable media of a computing device and including a plurality of instructions that, when executed, cause the computing device to: receive network activity data from an event auditor of the dynamically programmable computer network, the network activity data indicative of one or more network flows within network traffic of the dynamically programmable network; determine a current network context based on the network activity data, the current network context indicative of one or more current network flows of the dynamically programmable computer network; in response to the current network context, select a security policy, the security policy defining a criterion and a response to the one or more current network flows; and generate a flow policy directive to implement the response to the one or more current network flows on the dynamically programmable network.

An example 13 includes the network privilege manager of example 12, wherein the network privilege manager is to transmit the flow policy directive to a security actuator of the dynamically programmable computer network. An example 14 includes the network privilege manager network of example 12 or example 13, wherein to select the security policy includes to select a security policy having the criterion matching the current network context more than a predefined threshold number of times within a predefined time period. An example 15 includes the network privilege manager network of any of examples 12-14, wherein to select the security policy includes to select a contextual security policy having a criterion matching an event count within an update interval, the event count generated as a function of aggregated inbound network traffic or outbound network traffic. An example 16 includes the network privilege manager network of any of examples 12-15, and including a plurality of instructions that, when executed, cause the computing device to receive network role data describing a role associated with one or more hosts of the dynamically programmable computer network; wherein to determine the current network context includes to determine a role associated with an endpoint of a network flow within the network traffic. An example 17 includes the network privilege manager of any of examples 12-16, and includes a plurality of instructions that, when executed, cause the computing device to receive Internet Protocol (IP) reputation data from a network intelligence server, the IP reputation data to identify a plurality of malicious network addresses; wherein to determine the current network context includes to determine whether a network flow within the network traffic is associated with a malicious network address identified by the IP reputation data.

In an example 18, a security service for a computer network includes, embodied in one or more computing devices of the computer network: a context analysis module to: receive network activity data from an event auditor of the computer network, the network activity data generated as a function of network traffic of the computer network and indicative of one or more network flows within the network traffic; and determine a current network context based on the network activity data, the current network context indicative of one or more current network flows of the computer network; a policy evaluation module to, in response to the current network context: select a contextual security policy having a criterion matching the current network context, the contextual security policy defining the criterion and a response to the one or more current network flows; and generate a flow policy directive to implement the selected contextual security policy; and a policy directive interface module to transmit the flow policy directive to a security actuator of the computer network.

An example 19 includes the security service of example 18, and includes the security actuator, wherein the security actuator is to convert the flow policy directive to one or more packet disposition directives. An example 20 includes the security service of claim 19, and includes a security mediator to compare the one or more packet disposition directives to a set of currently active flow rules and implement the one or more packet disposition directives based on the comparison. An example 21 includes the security service of claim 19, wherein the one or more packet disposition directives are to cause one or more network switches to control flow of communications across the computer network to implement the flow policy directive. An example 22 includes the security service of claim 18, wherein to select the contextual security policy includes to select a contextual security policy having the criterion matching the current network context more than a predefined threshold number of times within a predefined time period. An example 23 includes the security service of claim 18, wherein the context analysis module is further to receive network role data describing a role associated with one or more hosts of the computer network; and to determine the current network context includes to determine a role associated with an endpoint of a network flow within the network traffic. An example 24 includes the security service of claim 18, wherein the context analysis module is further to receive Internet Protocol (IP) reputation data from a network intelligence server, the IP reputation data identifies a plurality of malicious network addresses; and to determine the current network context includes to determine whether a network flow within the network traffic is associated with a malicious network address identified by the IP reputation data.

In an example 25, an event auditor for monitoring a dynamically programmable computer network includes: a monitoring module to, over time, passively monitor network traffic passing through one or more network switches of the dynamically programmable computer network; and an analysis module to, in response to the monitoring by the monitoring module, generate network activity data as a function of the network traffic, the network activity data indicative of one or more network flows within the network traffic, and to update access control data, the access control data indicative of one or more of: acceptable network flows and unacceptable network flows.

An example 26 includes the event auditor of example 25, wherein the network activity data is further indicative of geographical data associated with each endpoint of the network flows. An example 27 includes the event auditor of example 25 or example 26, wherein the network activity data is further indicative of a domain name associated with each endpoint of the network flows. An example 28 includes the event auditor of any of examples 25-27, wherein the analysis module is further to generate network activity data indicative of an event count within an update interval, the event count generated as a function of aggregated inbound network traffic or outbound network traffic. An example 29 includes the event auditor of any of examples 25-28, wherein the event count includes a number of TCP flows, a number TCP packets, an amount of TCP data, a number of UDP packets, an amount of UDP data, a number of unresponded-to SYN packets, or a number of unsolicited SYN-ACK packets. An example 30 includes event auditor of any of examples 25-29, wherein the network activity data is further indicative of a final session disposition of each of the network flows.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the security actuator 102.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method comprising:

obtaining, by a computing device on a network, data comprising network activity data and reputation data and role data, wherein the network activity data includes data corresponding to a state of one or more network flows in the network and the reputation data identifies one or more acceptable or unacceptable network flows over the network and the role data identifies a role associated with an endpoint of a network flow on the network and at least some of the data corresponds to real-time activity;

determining a current network context using at least some of the data;

selecting a security policy from one or more security policies by matching a first portion of the current network context to a criterion of the security policy;

adjusting a value of a threshold attribute of the security policy based on the data that corresponds to real-time activity, wherein the value of the attribute identifies one or more of a number and a duration associated with network flows;

in response to a second portion of the current network context matching the adjusted value of the threshold attribute, cause execution of the security policy on the network to control traffic over the network.

2. The method of claim 1, further comprising:

selecting the security policy from one or more contextual security policies when the criterion matches the current network context more than a particular number of times within a particular time period.

3. The method of claim 1, further comprising:

selecting the security policy from one or more contextual security policies when the criterion matches an event count within an update interval.

4. The method of claim 1, wherein determining the current network context includes determining a role associated with an endpoint of a network flow within the network.

5. The method of claim 1, wherein the reputation data is received from a network intelligence server.

6. The method of claim 1, wherein the reputation data includes a threat type associated with a malicious network address.

7. The method of claim 1, further comprising:

updating the current network context after transmitting the directive.

8. The method of claim 1, further comprising:

receiving corroborating reputation data.

9. A computing device, comprising:

one or more processors; and a non-transitory computer-readable medium including instructions that, when executed by the one or more processors, cause the one or more processors to perform operations including:

generating network activity data, wherein the network activity data includes data corresponding to a current dynamic state of one or more network flows in a network, and wherein the network is dynamically programmable;

receiving reputation data, wherein the reputation data identifies one or more acceptable or unacceptable network flows over the network;

determining a current version of the reputation data and a current version of the network activity data, wherein a current version corresponds to real-time activity;

determining a current network context at a current time, wherein the current network context is associated with a criterion, and wherein the current network context is determined using at least some of the current version of the network activity data and at least some of the current version of the reputation data;

identifying a contextual security policy of one or more contextual security policies, wherein the contextual security policy is identified using the criterion associated with the current network context, wherein the contextual security policy defines an action corresponding to the current network context, and wherein the action defines one or more new flow rules;

adjusting a value of an attribute of the contextual security policy based on one or more of the network activity data and the reputation data that corresponds to real-time activity, wherein the value of the attribute identifies one or more of a number and a duration associated with network flows;

when the current network context matches the adjusted value of the attribute of the contextual security policy, generating a directive, wherein generating the directive includes using the contextual security policy and the current network context; and transmitting the directive, wherein when the directive is received, the directive facilitates programming the one or more new flow rules at a network switch when the network switch has no prior flow rules, or updating one or more pre-existing flow rules at the network switch when the network switch has one or more prior flow rules, to control the flow of traffic over the network.

10. The computing device of claim 9, further comprising:

selecting the contextual security policy from one or more contextual security policies when the criterion matches the current network context more than a particular number of times within a particular time period.

11. The computing device of claim 9, further comprising:

selecting the contextual security policy from one or more contextual security policies when the criterion matches an event count within an update interval.

12. The computing device of claim 9, wherein determining the current network context includes determining a role associated with an endpoint of a network flow within the network.

13. The computing device of claim 9, wherein the reputation data is received from a network intelligence server.

14. The computing device of claim 9, wherein the reputation data includes a threat type.

15. The computing device of claim 9, wherein the reputation data includes a threat type associated with a malicious network address.

16. The computing device of claim 9, further comprising:

updating the current network context after transmitting the directive.

17. The computing device of claim 9, further comprising:

receiving corroborating reputation data.

18. A computer-program product tangibly embodied in a non-transitory machine-readable storage medium of a computing device, including instructions configured to cause one or more data processors to:

generate network activity data, wherein the network activity data includes data corresponding to a current dynamic state of one or more network flows in a network, and wherein the network is dynamically programmable;

receive reputation data, wherein the reputation data identifies one or more acceptable or unacceptable network flows over the network;

determine a current version of the reputation data and a current version of the network activity data, wherein a current version corresponds to real-time activity;

determine a current network context at a current time, wherein the current network context is associated with a criterion, and wherein the current network context is determined using at least some of the current version of the network activity data and at least some of the current version of the reputation data;

identify a contextual security policy of one or more contextual security policies, wherein the contextual security policy is identified using the criterion associated with the current network context, wherein the contextual security policy defines an action corresponding to the current network context, and wherein the action defines one or more new flow rules;

adjust a value of an attribute of the contextual security policy based on one or more of the network activity data and the reputation data, wherein the value of the attribute identifies one or more of a number and a duration associated with network flows;

when the current network context matches the adjusted value of the attribute of the contextual security policy, generate a directive, wherein generating the directive includes using the contextual security policy and the current network context; and transmit the directive, wherein when the directive is received, the directive facilitates programming the one or more new flow rules at a network switch when the network switch has no prior flow rules, or updating one or more pre-existing flow rules at the network switch when the network switch has one or more prior flow rules, to control traffic over the network.

19. The computer-program product of claim 18, further comprising instructions that, when executed by the one or more data processors, cause the one or more processors to:
select the contextual security policy from one or more contextual security policies when the criterion matches the current network context more than a particular number of times within a particular time period.

20. The computer-program product of claim 18, further comprising instructions that, when executed by the one or more data processors, cause the one or more processors to:
select the contextual security policy from one or more contextual security policies when the criterion matches an event count within an update interval.

21. The computer-program product of claim 18, wherein determining the current network context includes determining a role associated with an endpoint of a network flow within the network.

22. The computer-program product of claim 18, wherein the reputation data is received from a network intelligence server.

23. The computer-program product of claim 18, wherein the reputation data includes a threat type associated with a malicious network address.

24. The computer-program product of claim 18, further comprising instructions that, when executed by the one or more data processors, cause the one or more processors to:
update the current network context after transmitting the directive.

25. The computer-program product of claim 18, further comprising instructions that, when executed by the one or more processors, cause the one or more processors to:
receive corroborating reputation data.

* * * * *